United States Patent
Gaal

(10) Patent No.: US 9,300,370 B2
(45) Date of Patent: Mar. 29, 2016

(54) PHASE DIFFERENCE SIGNALING IN MIMO MODE UPLINK

(75) Inventor: Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 556 days.

(21) Appl. No.: 13/346,540

(22) Filed: Jan. 9, 2012

(65) Prior Publication Data

US 2013/0176868 A1    Jul. 11, 2013

(51) Int. Cl.
| | |
|---|---|
| H04B 7/04 | (2006.01) |
| H04W 72/04 | (2009.01) |
| H04B 17/12 | (2015.01) |
| H04L 27/26 | (2006.01) |

(52) U.S. Cl.
CPC .............. *H04B 7/0404* (2013.01); *H04B 17/12* (2013.01); *H04L 27/2647* (2013.01); *H04W 72/048* (2013.01)

(58) Field of Classification Search
CPC .... H04B 7/0404; H04B 17/12; H04W 72/048
USPC ........................... 370/252, 329, 328; 375/267
See application file for complete search history.

(56) References Cited

U.S. PATENT DOCUMENTS

| | | | | |
|---|---|---|---|---|
| 2010/0034077 A1* | 2/2010 | Ishii | ......................... | H04J 11/00 370/210 |
| 2010/0150013 A1* | 6/2010 | Hara | ................... | H04L 25/0224 370/252 |
| 2010/0239034 A1* | 9/2010 | Lee | ........................ | H04L 5/0053 375/260 |
| 2010/0266063 A1* | 10/2010 | Harel | .................... | H04B 7/0623 375/267 |
| 2011/0149886 A1* | 6/2011 | Xu et al. | ........................ | 370/329 |
| 2012/0120997 A1* | 5/2012 | Park | ..................... | H04B 7/0413 375/224 |
| 2012/0314792 A1 | 12/2012 | Tesanovic et al. | | |
| 2013/0028203 A1 | 1/2013 | Hooli et al. | | |
| 2013/0089044 A1* | 4/2013 | Park et al. | ..................... | 370/329 |

OTHER PUBLICATIONS

3GPP TS 36.33 V10.2.0 (Jun. 2011) (http://www.qtc.jp/3GPP/Specs/36331-a20.pdf) Technical Specification Group Radio Access Network; Evolved Universal Terrestrial Radio Access (E-UTRA); Radio Resource Control (RRC); Protocol specification (Release 10).*

* cited by examiner

*Primary Examiner* — Un C Cho
*Assistant Examiner* — Fangyan Deng
(74) *Attorney, Agent, or Firm* — Norton Rose Fulbright US LLP

(57) ABSTRACT

An uplink signaling method is described where the UE transmits an indication of its ability to maintain relative transmit phase continuity with respect to a plurality of transmit chains thereof in place of being required to actually maintain the phase difference between its transmitters. The signaling method utilizes straightforward signaling with very little overhead, because the indication may be provided by setting the value of a bit in an uplink transmission. In response, a base station adopts an uplink transmission format for communications by the UE based, at least in part, upon the received indication.

26 Claims, 7 Drawing Sheets

PHASE DIFFERENCE SIGNALING IN MIMO MODE UPLINK

TECHNICAL FIELD

The present disclosure relates generally to wireless communications and more specifically to techniques for uplink communication in a multi-input multi-output (MIMO) wireless communication system.

BACKGROUND OF THE INVENTION

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A base station may include multiple transmit and/or receive antennas. Likewise, UEs may include multiple transmit and/or receive antennas. UEs may transmit in the uplink (UL) using transport block assignments indicated by the base station. In conventional wireless systems, such as the currently agreed upon version of the Long Term Evolution (LTE), the transmission in the uplink direction may be performed either as a single input, multiple output (SIMO) or as a closed loop MIMO transmission. With the introduction of UEs with up to four antennas in the LTE-Advanced (LTE-A) specification, additional uplink transmission modes may improve performance.

In MIMO wireless communication systems, it is often desirable for a UE to support spatial multiplexing wherein the UE transmits on at least two transmit signal layers. Doing so requires that it has at least two independent transmitters. Additionally, in some operating modes, it is desirable to transmit the same signal with different phases, i.e., without spatial multiplexing, on multiple independent transmitters. For example, data transmitted by a first UE transmitter and corresponding first transmit chain is transmitted with a first phase and data transmitted by a second UE transmitter and corresponding second transmit chain is transmitted with a second phase. To optimize uplink transmissions, the second phase may be offset from the first phase by one or more 90 degree increments (e.g., 90 degrees or 180 degrees). The difference in phase between a first UE transmitter and a second UE transmitter may be referred to as "phase difference" or "relative phase." To be most effective, the phase difference or relative phase should be held constant or near constant, referred to as maintaining relative transmit phase continuity, during uplink transmissions. A change in phase difference or relative phase may be referred to as "phase drift" or the inability to maintain relative transmit phase continuity. It is desirable to maintain relative transmit phase continuity even if the relative phase value is not one of the aforementioned 90 degree increments or not any predetermined value. As long as the relative transmit phase is substantially constant, the base station is able to direct the UE to adjust the relative transmit phase to become closer to one of the desired values. When the UE is not able to maintain relative transmit phase continuity, however, the transmit phase adjustment looses effectiveness.

It is often burdensome to require that a UE maintain relative transmit phase at a constant or near constant value. Several factors make it difficult for a UE to do so. Improper transmitter calibration may allow one or more of the transmitters to change in phase over time. Similarly, differences in the respective transmit chains may introduce changes in the relative transmit phase. Further, UEs are often manufactured with an emphasis on reducing size and cost. As a result, UEs often lack circuitry and/or software necessary to properly initialize or keep track of the phase of each transmitter.

Phase drift may also occur between UE transmitters when the transmitters transmit data at disparate powers. According to a common implementation, transmitter power is changed in stages by an analog gain switch. During operation, a UE transmitter may transmit data on a first channel (e.g., the Physical Uplink Shared Channel (PUSCH)) followed in time by a transmission on a second channel (e.g., the Sounding Reference Signals (SRS)). Because the power requirements for each channel are often different, the power of the first and second transmissions in time may be amplified according to a different number of gain stages. This introduces a relative phase change, particularly where the transmitters switch between channels (i.e., are subject to a changing number of gain stages) over time. If the phase changes in the individual transmit chains were identical, then the relative phase would be constant irrespective of the changes over time and over channels. However, the individual transmit chains are usually not identical due to design differences or part to part variations, therefore the relative transmit phase continuity will not be maintained.

One approach to enable a UE to maintain relative transmit phase continuity involves manufacturing a UE according to more stringent design specifications. Such an approach may require constructing large calibration tables, determining phase as a function of temperature, age, power, and the like. This approach is undesirable because it is both computationally burdensome and expensive.

In view of the above, it is desirable to provide wireless communications that avoid the expense and burden of requiring that a UE maintain phase difference between its transmitters, but instead, adopt a communication format utilized with respect to the UE according to a UE's ability to maintain relative transmit phase continuity (whether limited or not). This is desirable for a number of reasons including the fact that base stations in communication with UEs (e.g., evolved Node Bs) are generally equipped with relatively sophisticated hardware and software, and therefore, are better suited to make adjustments to optimize communications according to a UE's perceived abilities.

BRIEF SUMMARY OF THE INVENTION

In one aspect of the present disclosure, a method for wireless communications is provided which includes generating an indication of a user equipment (UE) capability for supporting relative transmit phase continuity between a first antenna and a second antenna, and transmitting a message including the indication to a base station.

In another aspect of the present disclosure, an apparatus for wireless communications is provided which includes means for generating an indication of a user equipment (UE) capability for supporting relative transmit phase continuity between a first antenna and a second antenna, and means for transmitting a message including the indication to a base station.

In still another aspect of the present disclosure, a computer program product for wireless communications is provided which includes a non-transitory computer-readable medium having program code recorded thereon. The program code includes program code to generate an indication of a user equipment (UE) capability for supporting relative transmit phase continuity between a first antenna and a second antenna, and program code to transmit a message including the indication to a base station.

In yet another aspect of the present disclosure, a wireless communication apparatus is provided which includes at least one processor and a memory coupled to the at least one processor. The processor is configured to generate an indication of a user equipment (UE) capability for supporting relative transmit phase continuity between a first antenna and a second antenna, and to transmit a message including the indication to a base station.

In one aspect of the present disclosure, a method for wireless communications is provided which includes receiving, at a base station, a message that includes an indication of a user equipment (UE) capability for supporting relative transmit phase continuity between first and second antennas of a UE, and determining, at the base station, a transmission format for the UE based, at least in part, on the indication of the UE capability.

In another aspect of the present disclosure, a wireless communication apparatus is provided which includes means for receiving, at a base station, a message that includes an indication of a user equipment (UE) capability for supporting relative transmit phase continuity between first and second antennas of a UE, and means for determining, at the base station, a transmission format for the UE based, at least in part, on the indication of the UE capability.

In still another aspect of the present disclosure, a computer program product for wireless communications is provided which includes a non-transitory computer-readable medium having program code recorded thereon. The program code includes program code to receive, at a base station, a message that includes an indication of a user equipment (UE) capability for supporting relative transmit phase continuity between first and second antennas of a UE, and program code to determine, at the base station, a transmission format for the UE based, at least in part, on the indication of the UE capability.

Various aspects and features of the disclosure are described in further detail below.

BRIEF DESCRIPTION OF THE DRAWINGS

For a more complete understanding of the present teachings, reference is now made to the following description taken in conjunction with the accompanying drawings.

DETAILED DESCRIPTION OF THE INVENTION

Figure 1:
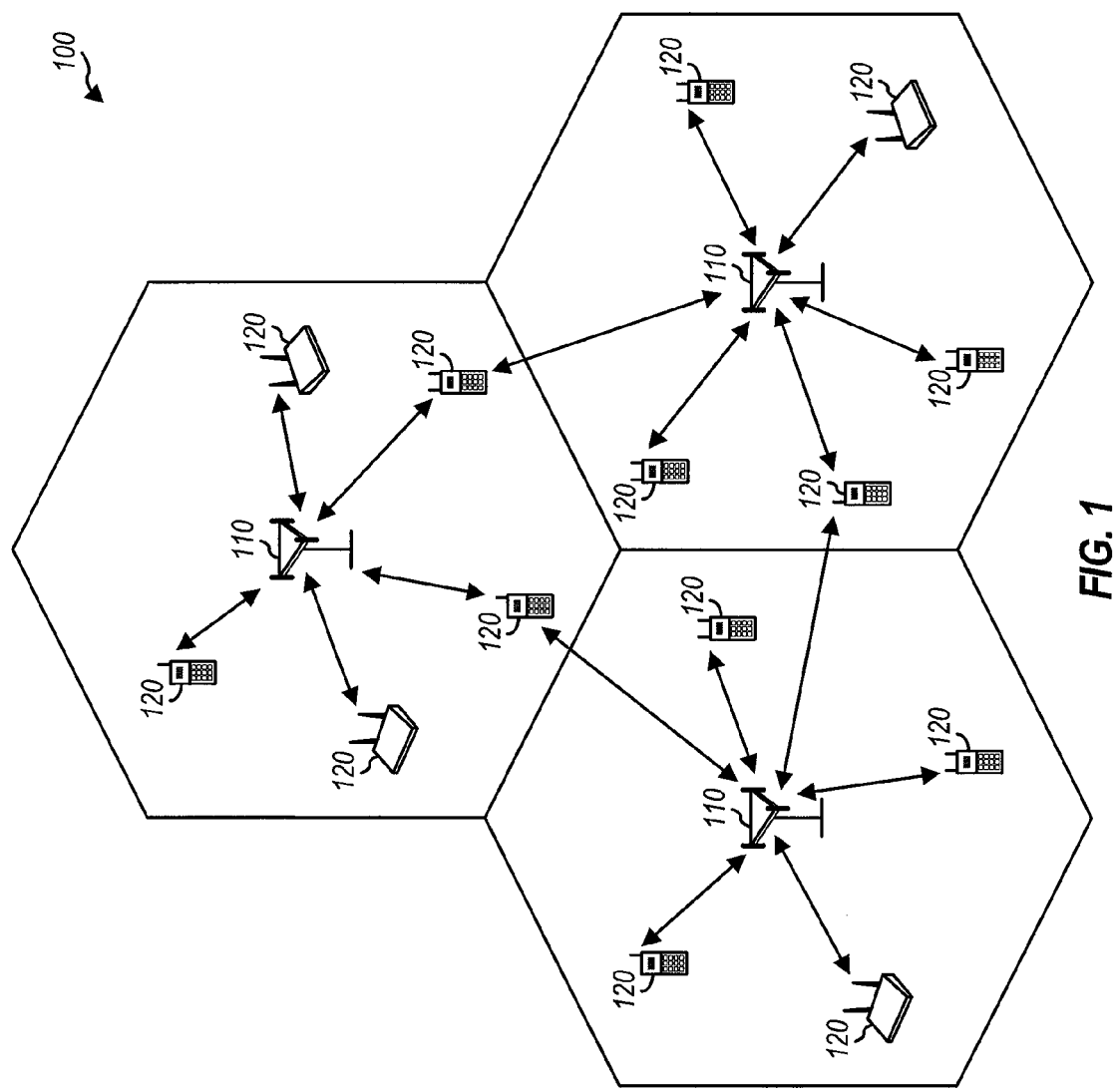
FIG. 1 is a block diagram conceptually illustrating an example of a mobile communication system.

As will be better appreciated from the discussion which follows, representative aspects of the present disclosure are directed to an uplink signaling scheme that allows a UE to avoid the expense and burden of maintaining relative transmit phase continuity between its transmitters while still providing satisfactory wireless communication links. In implementing such uplink transmission schemes according to embodiments, a UE transmits to a base station an indication of its ability to maintain relative transmit phase continuity with respect to a plurality of transmit chains thereof (e.g., a first and a second UE transmitter signal path). The base station uses the information regarding the UE's ability to maintain relative transmit phase continuity in adopting an uplink transmission format used with respect to the UE. For example, the base station may adopt an uplink transmission format biased toward selecting precoders that are not sensitive to phase difference, the base station may cycle through available precoders that are sensitive to phase difference, the base station may avoid scheduling based on precoding derived from SRS, or the base station may adopt scheduling that minimizes transmit power variations, thereby minimizing the chances for analog gain stage switches, etc., in order to provide a communication format compatible with the UE's indicated ability to maintain relative transmit phase continuity. Decisions regarding an optimal communication between the UE and base station, based at least in part of the UE's ability or inability to maintain relative transmit phase continuity, are made at the base station according to embodiments.

As previously discussed, it can be burdensome and expensive to implement a wireless communication system where a UE is required to maintain the relative phase difference between its transmitters at a constant or near constant value (i.e., maintain relative transmit phase continuity). Doing so often requires relatively expensive UE equipment and/or constructing large calibration tables and determining antenna phase as a function of temperature, age, power, and the like.

As discussed in detail below, a new wireless communication technique is introduced for use with respect to wireless communication networks adapted for MIMO communications. Rather than be required to maintain relative transmit phase continuity or even communicate using a transmit format which presents a need to maintain relative transmit phase continuity, a UE transmits an indication of its ability to maintain relative transmit phase continuity to a base station. The indication may be in the form of a bit value (e.g., a feature group indicator bit), where, e.g., a bit value of 1 indicates the UE's ability to maintain relative transmit phase continuity for uplink spatial multiplexing, and a bit value of 0 indicates a UE's inability to do the same. Thereafter, communications between the UE and base station are configured to accommodate the UE's indicated ability or inability to maintain relative transmit phase continuity.

In response to receiving an indication of the UE's ability to maintain relative transmit phase continuity, a base station selects a MIMO wireless communication format to optimize communications in view of that UE's ability or inability. Specifically, upon receiving the UE's indication, the base station of embodiments will select an uplink transmission scheduling format to accommodate the UE, according to the received indication.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

FIG. 1 shows a wireless communication system 100, which may be an LTE system or some other system. System 100 may include a number of base stations 110 and other network entities. A base station, which may also be referred to as an evolved Node Bs (eNB), access point, etc., is a network entity that may communicate with the UEs. Each base station 110 may provide communication coverage for a particular geographic area and may support communication for the UEs located within the coverage area. To improve capacity, the overall coverage area of a base station may be partitioned into multiple (e.g., three) smaller areas. Each smaller area may be served by a respective base station subsystem. In 3GPP, the term "cell" can refer to the smallest coverage area of base station 110 and/or a base station subsystem serving this coverage area.

UEs 120 may be dispersed throughout the system, and each UE 120 may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc.

LTE utilizes orthogonal frequency division multiplexing (OFDM) on the downlink and single-carrier frequency division multiplexing (SC-FDM) on the uplink. OFDM and SC-FDM partition a frequency range into multiple orthogonal subcarriers (Ks), which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (Ks) may be dependent on the system bandwidth. For example, Ks may be equal to 128, 256, 512, 1024 or 2048 for system bandwidth of 1.4, 3, 5, 10 or 20 mega-Hertz (MHz), respectively. The system bandwidth may correspond to a subset of the Ks total subcarriers.

Figure 2:
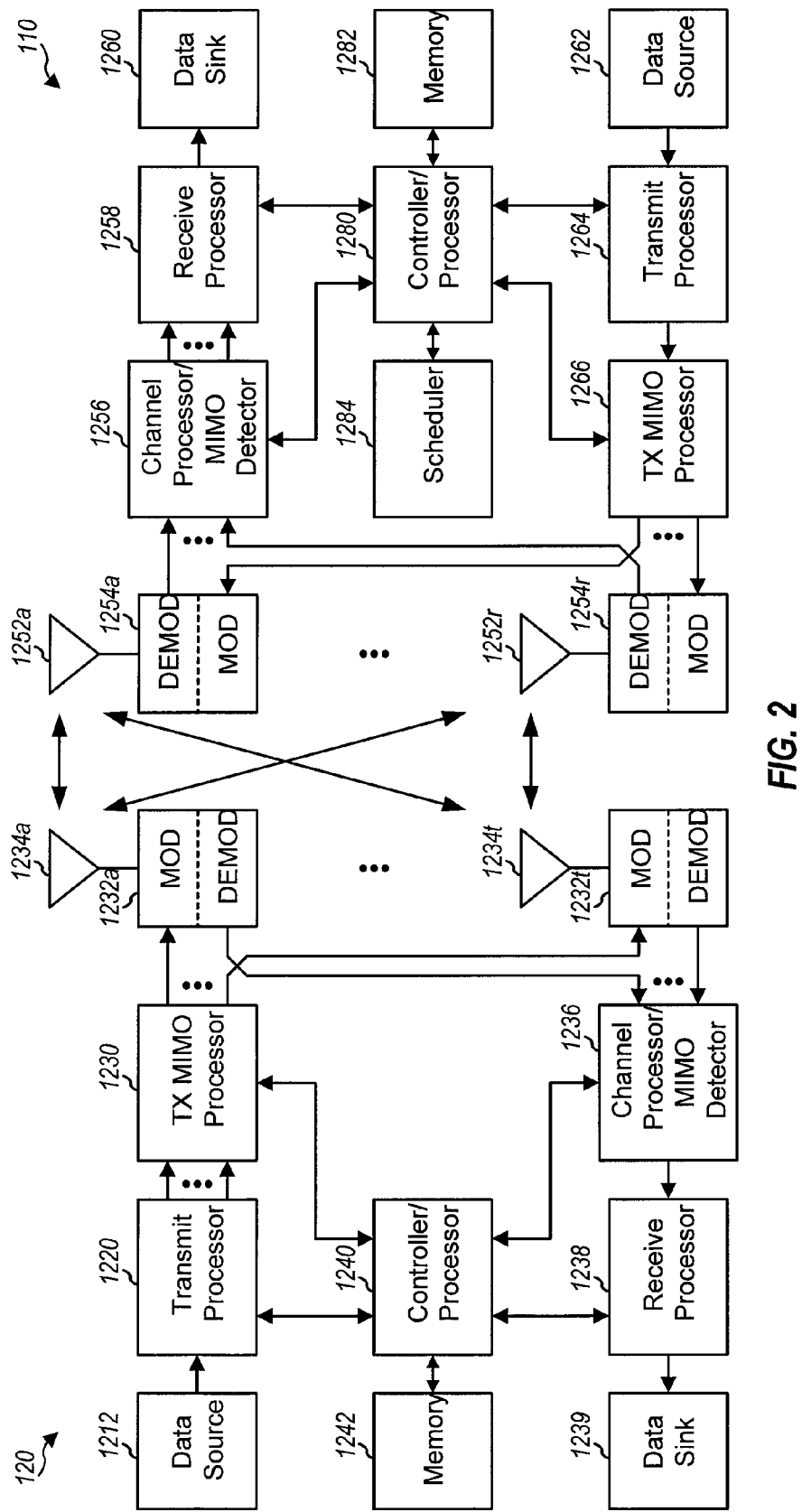
FIG. 2 is a block diagram conceptually illustrating a design of a base station/evolved Node B and a UE configured according to one aspect of the present disclosure.

FIG. 2 shows a block diagram of a design of an exemplary base station 110 and UE 120, which may be one of the base stations and UEs in FIG. 1. As shown in FIG. 2, UE 120 may be equipped with T (where in general T≥1) antennas, shown as antennas 1234a through 1234t, associated with corresponding transmit chains (e.g., a respective signal path of transmit processor 1220 and TX MIMO processor 1230, and respective one of modulators (MODs) 1232a through 1232t) and/or receive chains (e.g., a respective one of demodulators (DEMODs) 1232a through 1232t and respective signal path of channel estimator/MIMO detector 1236). Similarly, base station 110 may be equipped with R (where in general R≥1) antennas, shown as antennas 1252a through 1252r, associated with corresponding transmit chains (e.g., a respective signal path of TX MIMO processor 1266 and respective one of MODs 1254a through 1254r) and/or receive chains (e.g., a respective one of DEMODs 1254a through 1254r, and respective signal path of channel processor/MIMO detector 1256 and receive processor 1258).

In providing uplink communication, transmit processor 1220 of UE 120 may receive data from a data source 1212 and control information from a controller/processor 1240. Transmit processor 1220 may process (e.g., encode, interleave, and symbol map) the data and control information and may provide data symbols and control symbols, respectively. Transmit processor 1220 may also generate one or more demodulation reference signals (RSs) for multiple non-contiguous clusters based on one or more RS sequences assigned to UE 120 and may provide reference symbols. Transmit (TX) multiple-input multiple-output (MIMO) processor 1230 may perform spatial processing (e.g., precoding) on the data symbols, the control symbols, and/or the reference symbols from transmit processor 1220, if applicable, and may provide T output symbol streams to T modulators (MODs) 1232a through 1232t. Each modulator may process a respective output symbol stream (e.g., for SC-FDMA, OFDM, etc.) to obtain an output sample stream. Each modulator may further process (e.g., convert to analog, amplify, filter, and upconvert) the output sample stream to obtain an uplink signal. T uplink signals from modulators 1232a through 1232t may be transmitted via T antennas 1234a through 1234t, respectively.

Figure 3:
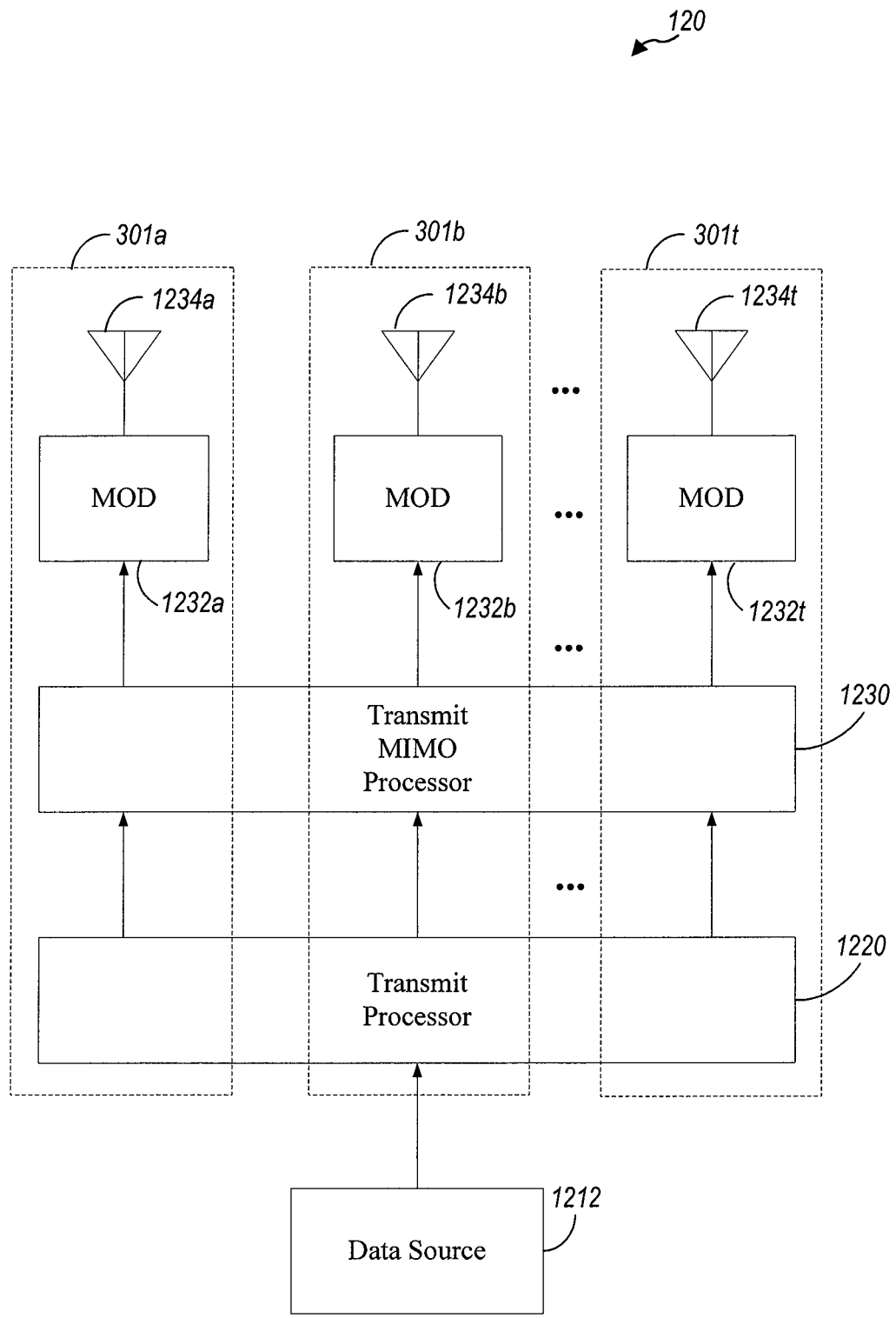
FIG. 3 is a block diagram conceptually illustrating transmit chains of a mobile communication system.

FIG. 3 illustrates the aforementioned transmit chains of UE 120. In particular, transmit chain 301a is shown as including a particular signal path of transmit processor 1220 and TX MIMO processor 1230, MOD 1232a, and antenna 1234a. Similarly, transmit chain 301b is shown as including a different particular signal path of transmit processor 1220 and TX MIMO processor 1230, MOD 1232b, and antenna 1234b while transmit chain 301t is shown as including a still different particular signal path of transmit processor 1220 and TX MIMO processor 1230, MOD 1232t, and antenna 1234t. It can be appreciated from the foregoing that various ones of these transmit chains may introduce differing amounts of signal processing delays (e.g., phase drift) with respect to the signals processed thereby.

Referring again to FIG. 2, antennas 1252a through 1252r of base station 110 may receive the uplink signals from UE 120 and provide received signals to demodulators (DEMODs) 1254a through 1254r, respectively. Each demodulator may condition (e.g., filter, amplify, downconvert, and digitize) a respective received signal to obtain received samples. Each demodulator may further process the received samples to obtain received symbols. A channel processor/MIMO detector 1256 may obtain received symbols from all R demodulators 1254a through 1254r. Channel processor 1256 may derive a channel estimate for a wireless channel from UE 120 to base station 110 based on the demodulation reference signals received from UE 120. MIMO detector 1256 may perform MIMO detection/demodulation on the received symbols based on the channel estimate and may provide detected symbols. A receive processor 1258 may process (e.g., symbol demap, deinterleave, and decode) the detected symbols, provide decoded data to a data sink 1260, and provide decoded control information to a controller/processor 1280.

On the downlink, data from a data source 1262 and control information from controller/processor 1280 may be processed at base station 110 by transmit processor 1264, precoded by a TX MIMO processor 1266 if applicable, conditioned by modulators 1254a through 1254r, and transmitted to UE 120 using antennas 1252a through 1252r. At UE 120, the downlink signals from base station 110 may be received by antennas 1234a through 1234t, conditioned by demodulators 1232a through 1232t, processed by a channel estimator/MIMO detector 1236, and further processed by a receive processor 1238 to obtain the data and control information sent to UE 120. Processor 1238 may provide the decoded data to a data sink 1239 and the decoded control information to controller/processor 1240.

Controllers/processors 1240 and 1280 may direct the operation at UE 120 and base station 110, respectively. Processor 1220, processor 1240, and/or other processors and modules at UE 120 may include the modules of apparatus 400 in FIG. 4 and perform or direct process 500 in FIG. 5, in addition to or in the alternative to performing or directing other processes for the techniques described herein. Processor 1256, processor 1280, and/or other processors and modules at base station 110 may include the modules of apparatus 600 in FIG. 6 and perform or direct process 700 in FIG. 7, in addition to or in the alternative to performing or directing other processes for the techniques described herein. Memories 1242 and 1282 may store data and program codes for UE 120 and base station 110, respectively. Scheduler 1284 may schedule UEs for downlink and/or uplink transmission and may provide allocations of resources (e.g., assignment of multiple non-contiguous clusters, RS sequences for demodulation reference signals, etc.) for the scheduled UEs. For example, scheduler 1284 schedules UEs for uplink transmission (e.g., provides the schedule of an uplink scheduling grant) to adopt an uplink transmission format used with respect to the UE optimized or otherwise consistent with the UE's ability to maintain relative transmit phase continuity. Accordingly, a selected uplink transmission format may be implemented as a function of the aforementioned scheduling grant.

In wireless communication operation herein, various uplink transmission modes or formats are available to UE 120 for transmission to base station 110. As previously mentioned, a UE's ability to maintain relative transmit phase continuity may affect the effectiveness or suitability of a particular uplink transmission format for use by the UE. Accordingly, techniques implemented according to concepts herein provide for selection of particular uplink transmission modes based at least in part on the UE's ability or inability to maintain relative transmit phase continuity.

Figure 4:
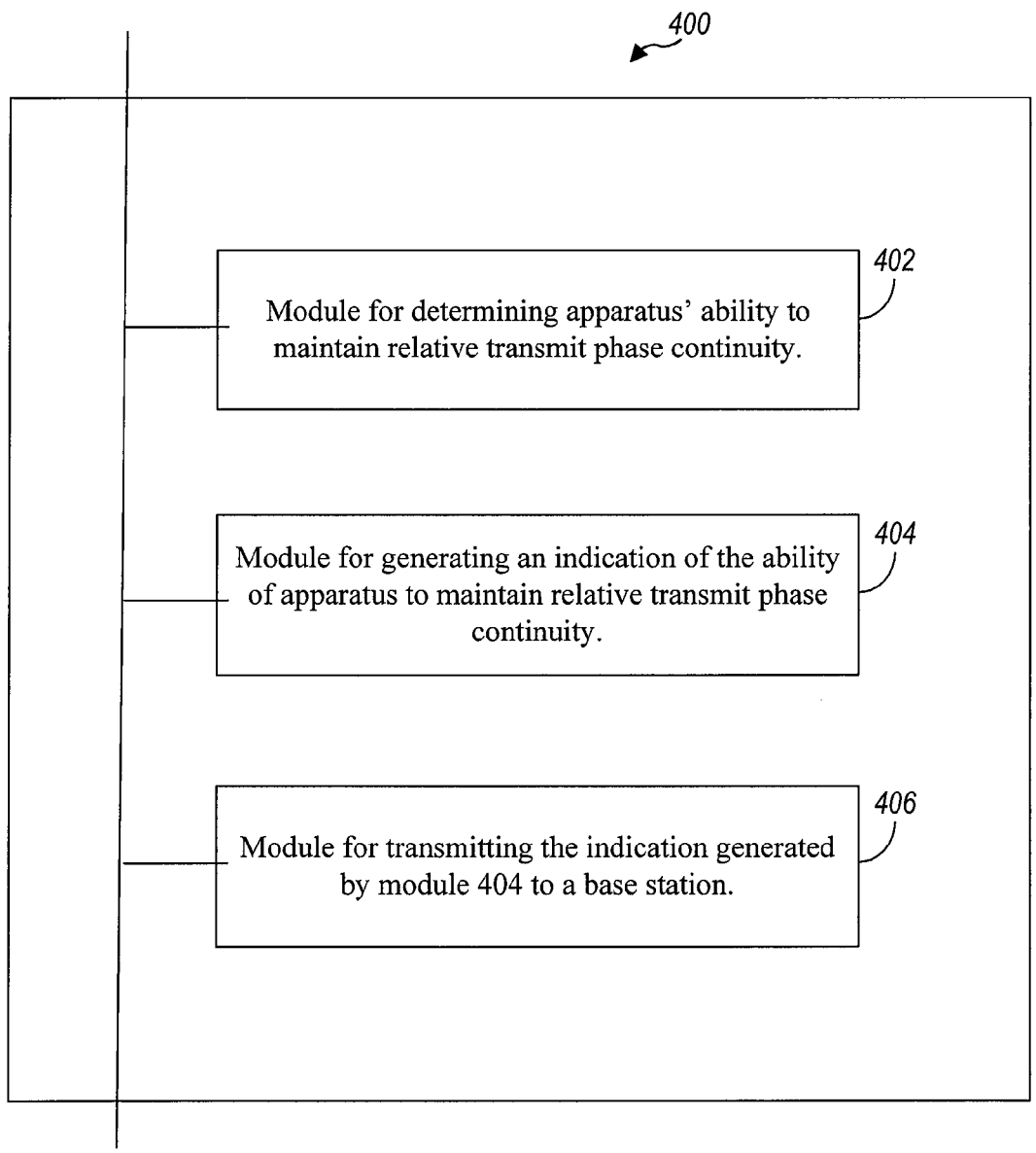
FIG. 4 is a functional block diagram illustrating an apparatus for wireless communication according to one aspect of the present disclosure.

FIG. 4 is a functional block diagram illustrating apparatus 400 for wireless communication (e.g., one or more component or portion of UE 120) comprising modules 402, 404, and 406 cooperating to provide operation as described herein with respect to UEs. Each of modules 402, 404, and 406 may comprise software, program code, or other logic (e.g., application specific integrated circuit (ASIC), field programmable gate array (FPGA), etc.), as may be operable upon or with a processor (e.g., controller/processor 1240) to provide the functions described below.

Module 402 operates to determine the ability of apparatus 400 to maintain relative transmit phase continuity with respect to a plurality of transmit chains thereof. A UE's ability to maintain relative transmit phase continuity may be defined to mean the UE is capable of maintaining a stable (e.g., within a predefined threshold range) relative phase between the signals at a plurality of antennas across multiple subframes during uplink transmissions.

Information for making the determination may be pre-stored in the UE (e.g., in module 402) during the manufacture of apparatus 400. For example, the determination may be based on various operational parameters, whereby information regarding the UE's capabilities with respect to these various operational parameters may be pre-stored in the UE. As one example of the foregoing, the determination may be operating band specific where the UE supports operation on multiple bands and has separate transmit chains for operating bands or groups of operating bands. The UE may, for example, have two MIMO transmit chains for bands below 1 GHz and separately two other MIMO transmit chains for bands above 1 GHz. The transmit chains may have different phase calibration quality, and thus it is possible that the UE is able to maintain relative transmit phase continuity in a subset of the operating bands but not in the remainder of the operating bands. The determination regarding the UE's ability to maintain relative transmit phase continuity may thus be dependent on the current operating band, and use information (e.g. operating band transmit chain phase calibration quality) pre-stored in the UE regarding the UE's capabilities with respect to that operating band. Similarly, the determination may be dependent on other operating parameters, for example, the power supply voltage (battery charge level) among other things.

Information for making the determination may additionally or alternatively be received by apparatus 400 from other components within the wireless communication network (e.g., base station 110) on a periodic or aperiodic basis, where, for example, a UE's ability may be determined by comparing the UE's performance capabilities to predetermined thresholds. Such thresholds may be set to according to system parameters, user requirements, and the like.

Module 404 operates to generate an indication of the ability of apparatus 400 to maintain relative transmit phase continuity. The generated indication may comprise a Feature Group Indicator bit, as described in LTE release 10, Annex C. Module 404 may set indicator(s) that correspond to the UE's functionality to maintain spatial multiplexing in UL (i.e., maintain constant relative phase). For example, a Feature Group Indicator bit corresponding to the UE's ability to maintain UL spatial multiplexing may be set to 1 to indicate that feature is provided by the UE. On the other hand, that bit may be set to 0 to indicate the UE is not capable of maintaining UL spatial multiplexing.

Module 406 operates to transmit the indication generated by module 404 to a station in communication with apparatus 400 (e.g., base station 110). According to one design, module 406 may transmit the indication on a periodic basis to ensure that communication between the UE and base station is maintained and optimized over time. Additionally or alternatively, module 406 may transmit the indication aperiodically, perhaps upon the occurrence of an event or condition, such as handoff, loss of power, loss of signal, and the like. Providing such periodic and/or aperiodic transmission of the indicator helps ensure that communications between the apparatus (e.g., UE 120) and other station (e.g. base station 110) is optimized over changing conditions.

Figure 5:
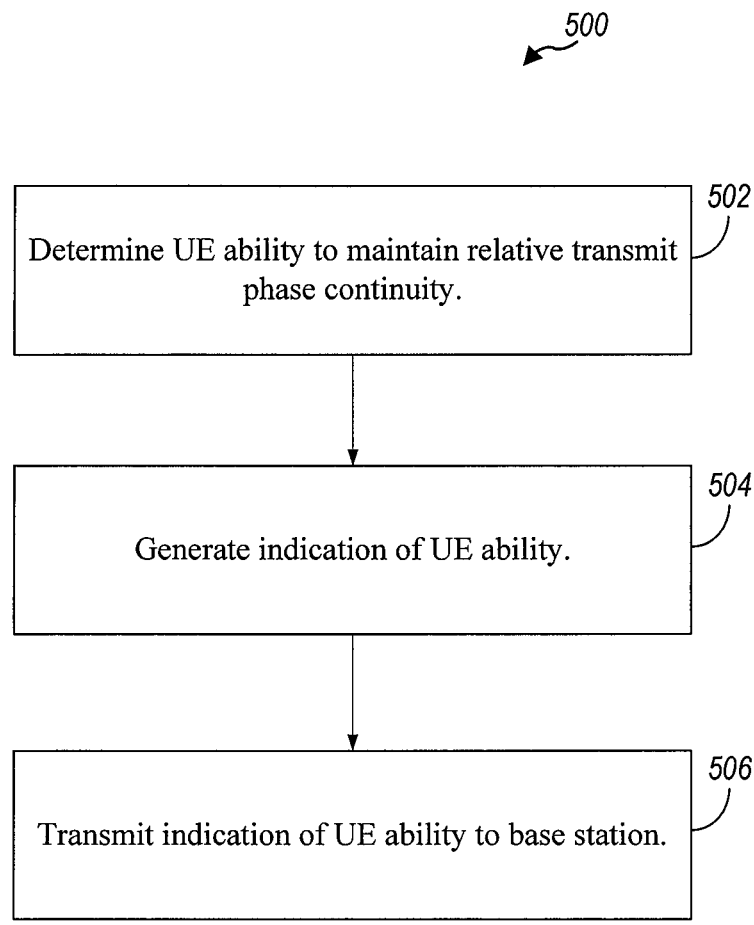
FIG. 5 is a flow diagram illustrating example blocks executed to implement one aspect of the present disclosure.

FIG. 5 is a flow diagram illustrating block sequence 500 of example blocks executed, such as by operation of apparatus 400, to communicate an indication of a UE's ability to maintain relative transmit phase continuity with respect to a plurality of transmit chains thereof to a base station. At block 502, a determination is made of the UE's ability to maintain relative transmit phase continuity. An indication of the UE's ability, as determined at block 502, is generated at block 504. The indication of the UE's ability is then transmitted to the base station at block 506.

Figure 6:
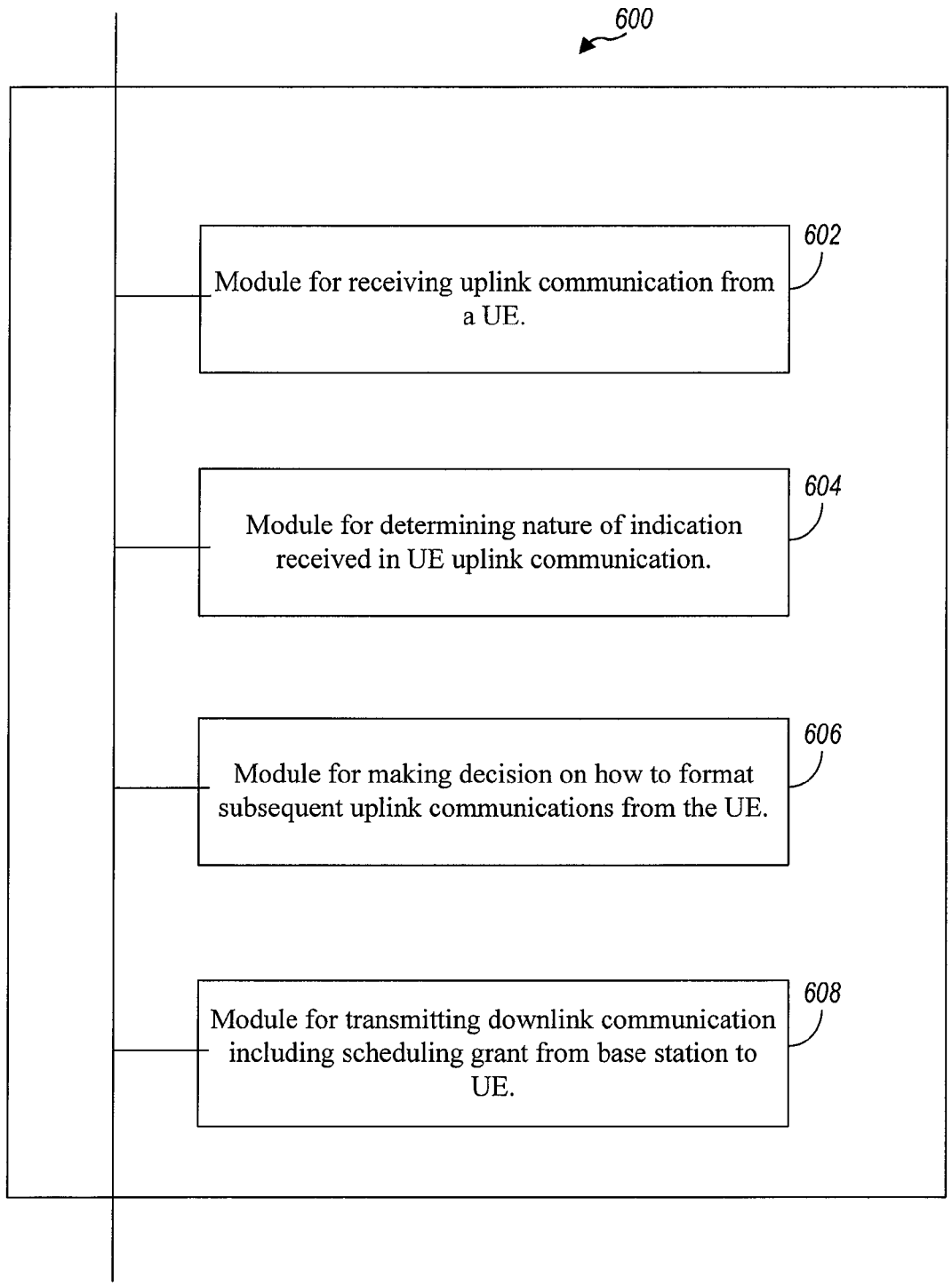
FIG. 6 is a functional block diagram representation of a wireless communication transmitter apparatus configured according to one aspect of the present disclosure.

FIG. 6 is a functional block diagram illustrating apparatus 600 for wireless communication (e.g., one or more component or portion of base station 110) comprising modules 602, 604, 606, and 608 cooperative to provide operation as described herein with respect to base stations. Each of modules 602, 604, 606, and 608 may comprise software, program code, or other logic (e.g., ASIC, FPGA, etc.), as may be operable upon or with a processor (e.g., controller/processor 1280) to provide the functions described below.

Module 602 operates to receive an uplink communication from a UE comprising an indication of the UE's ability to maintain relative transmit phase continuity with respect to a plurality of transmit chains of the UE. Module 604 operates to determine the nature of the indication received in the UE's uplink communication. Module 604 may, for example, extract the information and take steps to determine the nature of the indication.

Module 606 operates to make a decision on how to format subsequent uplink communications from the UE based on the information extracted by module 604. For example, the base station may choose an uplink transmission format for a UE biased toward selecting precoders that are not sensitive to phase difference when the base station received an indication that the UE is not able to maintain relative transmit phase continuity. An example of such a precoder is the UL rank-2 precoder defined for two transmit antennas in the 3GPP LTE Release 10 standard. A base station may also cycle through available precoders of a given transmission rank that are sensitive to phase difference to gain diversity in the case that the base station received an indication that the UE is not able to maintain relative transmit phase continuity. An example of such precoders is the set of UL rank-1, rank-2, and rank-3 precoders defined for four transmit antennas in the 3GPP LTE Release 10 standard.

Another example of precoders that are sensitive to phase difference is a subset of UL rank-1 precoders defined for two transmit antennas in the 3GPP LTE Release 10 standard. The full set of UL precoders for two transmit antennas defined in the 3GPP LTE Release 10 standard is given in the table below.

| Codebook index | Number of layers | |
|---|---|---|
| | $v = 1$ | $v = 2$ |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | — |
| 2 | $\frac{1}{\sqrt{2}}\begin{bmatrix}1\\j\end{bmatrix}$ | — |
| 3 | $\frac{1}{\sqrt{2}}\begin{bmatrix}1\\-j\end{bmatrix}$ | — |
| 4 | $\frac{1}{\sqrt{2}}\begin{bmatrix}1\\0\end{bmatrix}$ | — |
| 5 | $\frac{1}{\sqrt{2}}\begin{bmatrix}0\\1\end{bmatrix}$ | — |

Among the seven precoders defined in the table above, precoder indices 0, 1, 2, and 3 for rank-1 (i.e. $v=1$, no spatial multiplexing) all correspond to precoders that are sensitive to phase difference. The remainder of the precoders, i.e. precoder indices 4 and 5 for rank-1 ($v=1$) and precoder index 0 for rank-2 (i.e. $v=2$, spatial multiplexing) all correspond to precoders that are not sensitive to phase difference. Therefore an example base station implementation may be biased toward selecting precoder indices 4 and 5 for rank-1 (i.e. $v=1$) or precoder index 0 for rank-2 (i.e. $v=2$) when the base station received an indication that the UE with two transmit antennas is not able to maintain relative transmit phase continuity. Alternatively, the base station may be biased towards selecting rank-2 transmission over rank-1 transmission. Another example base station implementation may cycle through precoder indices 0, 1, 2, 3 for rank-1 when the base station received an indication that the UE with two transmit antennas is not able to maintain relative transmit phase continuity. Also, the base station may ignore the relative phase information as unreliable when obtained by the reception of UE SRS transmissions. On the other hand, when the base station received an indication that the UE is able to maintain relative transmit phase continuity, the base station may choose precoders in an unbiased and unrestricted fashion and it may rely on the relative phase information obtained by the reception of UE SRS transmissions.

Alternatively, the base station may choose power control and scheduling strategy that minimizes transmit power variation for the UE that was indicated as not being capable to maintain relative transmit phase continuity. This minimizes the likelihood of changing the number of gain stages in the UE, thereby promoting the maintenance of relative transmit phase continuity by the UE if the UE is not able to maintain relative transmit phase continuity across disparate power levels.

Module 608 operates to transmit, from the base station, a downlink communication to the UE including a scheduling grant for implementing an uplink transmission format decided upon by module 606. For example, where the indication received in the UE's uplink communication suggests that the UE is not able to maintain relative transmit phase continuity, the base station may determine and transmit a scheduling grant which accommodates the UE's inability to maintain relative transmit phase continuity (e.g., adopts an uplink transmission format biased toward selecting precoders that are not sensitive to phase difference, cycles through available precoders that are sensitive to phase difference, avoids scheduling based on precoding derived from SRS, adopts scheduling that minimizes transmit power variations, etc.). Alternatively, where the indication in the UE's uplink communication suggests that the UE is able to maintain relative transmit phase continuity, the base station may determine and transmit a scheduling grant which relies upon the UE's ability to maintain relative transmit phase continuity (e.g., adopts a spatial multiplexing uplink transmission format, etc.).

Figure 7:
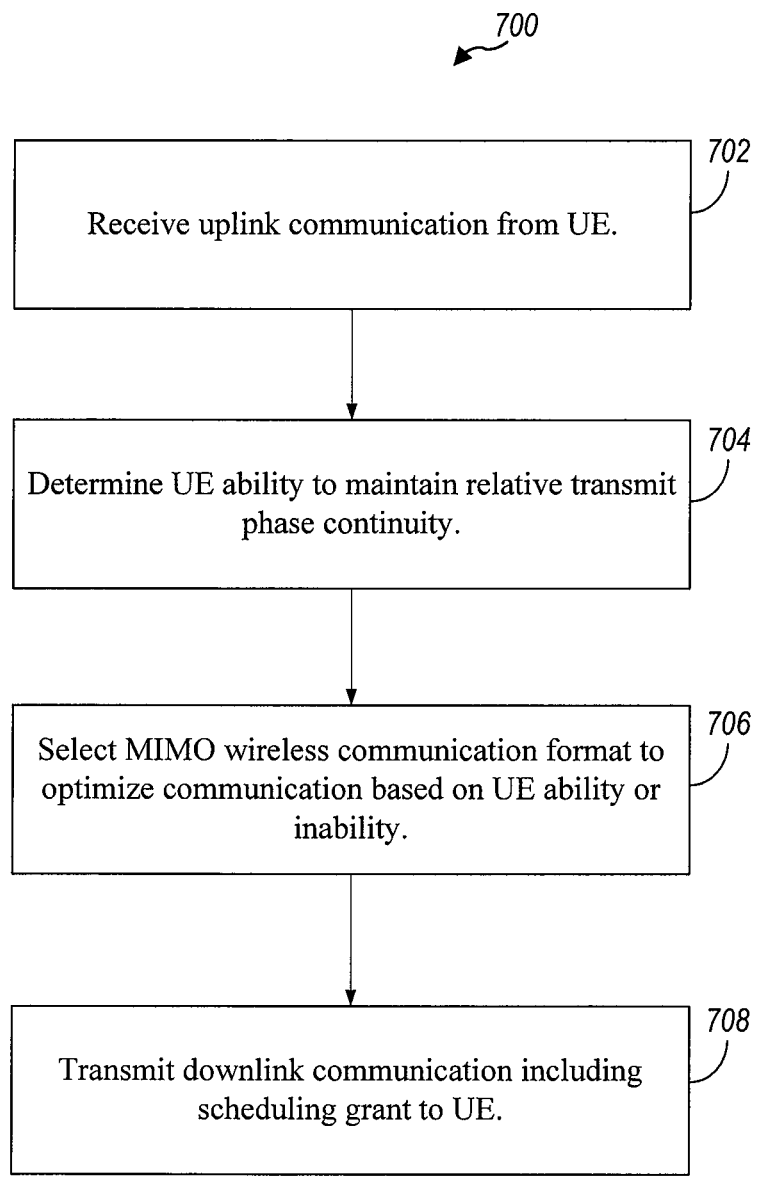
FIG. 7 is a flow diagram illustrating example blocks executed to implement one aspect of the present disclosure.

FIG. 7 is a flow diagram illustrating block sequence 700 of example blocks executed, such as by operation of apparatus 600, to communicate a scheduling grant to a UE for implementing an uplink transmission format based on an indication of the UE's ability to maintain relative transmit phase continuity with respect to a plurality of transmit chains of the UE. At block 702, an uplink communication is received from the UE. At block 704 a determination of the UE's ability to maintain phase difference is made based on the received uplink communication. In response, at block 706, upon making a determination of the UE's ability to maintain the phase difference between its transmitters, the base station selects a MIMO wireless communication format to optimize uplink communications in view of that UE's ability or inability. For example, where a base station receives an indication that the UE is not able to maintain relative transmit phase continuity, the base station may adopt an uplink transmission format which accommodates the UE's inability to maintain phase difference (e.g., adopts a transmission format biased toward selecting precoders that are not sensitive to phase difference, cycles through available precoders that are sensitive to phase difference, avoids scheduling based on precoding derived from SRS, adopts scheduling that minimizes transmit power variations, etc.). At block 708, the base station transmits a downlink communication to the UE including a scheduling grant to implement the uplink transmission format decided upon at block 706. As seen from the above, the format of the uplink communication is determined by the indication received from the UE.

As will be appreciated, the new uplink signaling method described herein enables a UE to avoid the burden and expense of maintaining the phase difference between its transmitters. Instead, the UE merely transmits an indication of its ability to maintain relative transmit phase continuity (i.e., its ability to support spatial multiplexing in uplink transmissions). According to one design, the uplink signaling method utilizes straightforward signaling with very little overhead, because the indication may be provided by setting the value of a bit in an uplink transmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a non-transitory computer-readable medium. Non-transitory computer-readable media includes computer storage media and the like. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

Although the present teachings and their advantages have been described in detail, it should be understood that various changes, substitutions and alterations can be made herein without departing from the technology of the teachings as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present teachings. Accordingly, the appended claims are intended to include within their scope such processes, machines, manufacture, compositions of matter, means, methods, or steps.

What is claimed is:

1. A method for wireless communications, the method comprising:
   generating an indication of a user equipment (UE) capability for supporting relative transmit phase continuity between a first antenna and a second antenna;
   setting a feature group indicator bit to a value corresponding to the UE capability for supporting relative transmit phase continuity for spatial multiplexing in uplink;
   transmitting a message including the indication to a base station; and
   receiving a transmission format from the base station, wherein the received transmission format is configured, in response to the indication, to accommodate the UE capability for supporting relative transmit phase continuity.

2. The method of claim 1, further including:
   receiving, at a UE, an uplink scheduling grant, based at least in part on the indication of the UE capability.

3. An apparatus for wireless communications, the apparatus comprising:
   means for generating an indication of a user equipment (UE) capability for supporting relative transmit phase continuity between a first antenna and a second antenna;
   means for setting a feature group indicator bit to a value corresponding to the UE capability for supporting relative transmit phase continuity for spatial multiplexing in uplink;
   means for transmitting a message including the indication to a base station; and
   means for receiving a transmission format from the base station, wherein the received transmission format is configured, in response to the indication, to accommodate the UE capability for supporting relative transmit phase continuity.

4. The apparatus of claim 3, further including:
   means for receiving an uplink scheduling grant from the base station, wherein the uplink scheduling grant identifies a transmission format for the UE, and wherein the transmission format is determined based at least in part on the indication of the UE capability.

5. A non-transitory computer-readable medium having program code recorded thereon, comprising:
   program code for causing at least one computer to generate an indication of a user equipment (UE) capability for supporting relative transmit phase continuity between a first antenna and a second antenna;
   program code for causing the at least one computer to set a feature group indicator bit to a value corresponding to the UE capability for supporting relative transmit phase continuity for spatial multiplexing in uplink;
   program code for causing the at least one computer to transmit a message including the indication to a base station; and
   program code for causing the at least one computer to receive a transmission format from the base station, wherein the received transmission format is configured, in response to the indication, to accommodate the UE capability for supporting relative transmit phase continuity.

6. The non-transitory computer-readable medium of claim 5, further including:
   program code for causing the at least one computer to receive, at a UE, an uplink scheduling grant, based at least in part on the indication of the UE capability.

7. A wireless communication apparatus comprising:
   at least one processor; and
   a memory coupled to the at least one processor, wherein the at least one processor is configured:
   to generate an indication of a user equipment (UE) capability for supporting relative transmit phase continuity between a first antenna and a second antenna;
   to set a feature group indicator bit to a value corresponding to the UE capability for supporting relative transmit phase continuity for spatial multiplexing in uplink;
   to transmit a message including the indication to a base station; and
   to receive a transmission format from the base station, wherein the received transmission format is configured, in response to the indication, to accommodate the UE capability for supporting relative transmit phase continuity.

8. The wireless communication apparatus of claim 7, wherein the at least one processor is further configured to receive, at a UE, an uplink scheduling grant, based at least in part on the indication of the UE capability.

9. A method for wireless communications, the method comprising:
   receiving, at a base station, a message that includes an indication of a user equipment (UE) capability for supporting relative transmit phase continuity between first and second antennas of a UE;
   analyzing a feature group indicator bit within the message to identify a value corresponding to the UE capability for supporting relative transmit phase continuity for spatial multiplexing in uplink; and
   determining, at the base station, a transmission format for the UE based, at least in part, on the indication of the UE capability, wherein the transmission format is configured to accommodate the UE capability for supporting relative transmit phase continuity.

10. The method of claim 9, further including:
    transmitting, from the base station, an uplink scheduling grant providing the transmission format for the UE.

11. The method of claim 9, wherein the determining includes selecting transmission rank and precoders that are not sensitive to phase difference.

12. The method of claim 9, wherein the determining includes determining an uplink transmission schedule to cycle through available precoders that are sensitive to phase difference.

13. The method of claim 9, wherein the determining includes avoiding scheduling based on precoding derived from sounding reference signals (SRS).

14. The method of claim 9, wherein the determining includes adopting scheduling that minimizes transmit power variations at the UE.

15. A wireless communication apparatus comprising:
 means for receiving a message that includes an indication of a user equipment (UE) capability for supporting relative transmit phase continuity between first and second antennas of a UE;
 means for analyzing a feature group indicator bit within the message to identify a value corresponding to the UE capability for supporting relative transmit phase continuity for spatial multiplexing in uplink; and
 means for determining a transmission format for the UE based, at least in part, on the indication of the UE capability, wherein the transmission format is configured to accommodate the UE capability for supporting relative transmit phase continuity.

16. The wireless communication apparatus of claim 15, further including:
 means for transmitting an uplink scheduling grant to the UE, wherein the uplink scheduling grant identifies the transmission format for the UE.

17. The wireless communication apparatus of claim 15, wherein the means for determining includes means for selecting transmission rank and precoders that are not sensitive to phase difference.

18. The wireless communication apparatus of claim 15, wherein the means for determining includes means for determining an uplink transmission schedule to cycle through available precoders that are sensitive to phase difference.

19. The wireless communication apparatus of claim 15, wherein the means for determining includes means for avoiding scheduling based on precoding derived from sounding reference signals (SRS).

20. The wireless communication apparatus of claim 15, wherein the means for determining includes means for adopting scheduling that minimizes transmit power variations at the UE.

21. A non-transitory computer-readable medium having program code recorded thereon, comprising:
 program code for causing at least one computer to receive, at a base station, a message that includes an indication of a user equipment (UE) capability for supporting relative transmit phase continuity between first and second antennas of a UE;
 program code for causing the at least one computer to analyze a feature group indicator bit within the message to identify a value corresponding to the UE capability for supporting relative transmit phase continuity for spatial multiplexing in uplink; and
 program code for causing the at least one computer to determine, at the base station, a transmission format for the UE based, at least in part, on the indication of the UE capability, wherein the transmission format is configured to accommodate the UE capability for supporting relative transmit phase continuity.

22. The non-transitory computer-readable medium of claim 21, further including:
 program code for causing the at least one computer to transmit, from the base station, an uplink scheduling grant providing the transmission format for the UE.

23. The non-transitory computer-readable medium of claim 21, wherein the program code for causing the at least one computer to determine a transmission format for the UE includes program code for causing the at least one computer to select transmission rank and precoders that are not sensitive to phase difference.

24. The non-transitory computer-readable medium of claim 21, wherein the program code for causing the at least one computer to determine a transmission format for the UE includes program code for causing the at least one computer to determine an uplink transmission schedule to cycle through available precoders that are sensitive to phase difference.

25. The non-transitory computer-readable medium of claim 21, wherein the program code for causing the at least one computer to determine a transmission format for the UE includes program code for causing the at least one computer to avoid scheduling based on precoding derived from sounding reference signals (SRS).

26. The non-transitory computer-readable medium of claim 21, wherein the program code for causing the at least one computer to determine a transmission format for the UE includes program code for causing the at least one computer to adopt scheduling that minimizes transmit power variations at the UE.

* * * * *